(No Model.)  2 Sheets—Sheet 1.

J. H. McCORMICK.
MACHINE FOR DELINTING COTTON SEED.

No. 411,294.  Patented Sept. 17, 1889.

Witnesses

Inventor
John H. McCormick.
By his Attorney
W. R. Stringfellow (No Model.) 2 Sheets—Sheet 2.
J. H. McCORMICK.
MACHINE FOR DELINTING COTTON SEED.
No. 411,294. Patented Sept. 17, 1889.
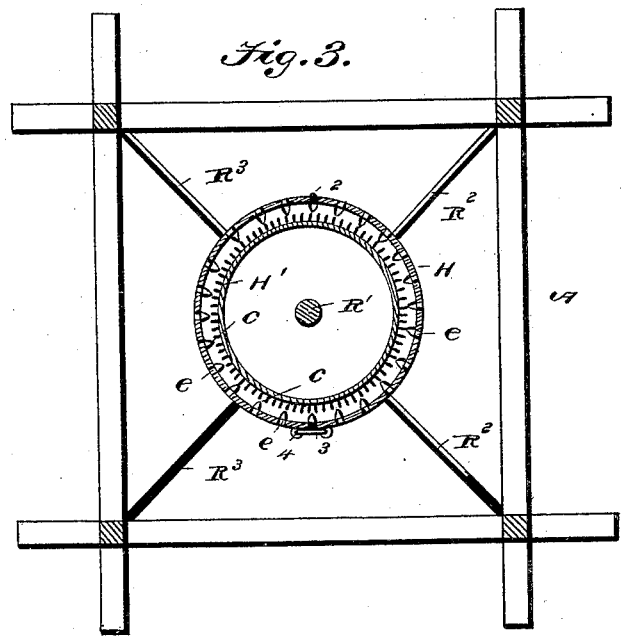
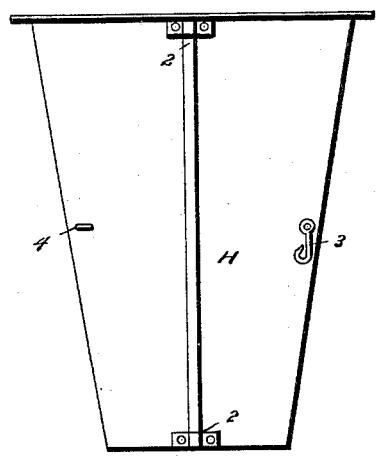
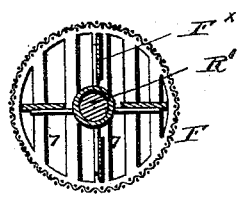
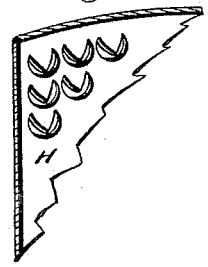
Witnesses
Inventor
John H. McCormick.
By his Attorney
W. R. Stringfellow

UNITED STATES PATENT OFFICE.

JOHN H. McCORMICK, OF NEW ORLEANS, LOUISIANA.

MACHINE FOR DELINTING COTTON-SEED.

SPECIFICATION forming part of Letters Patent No. 411,294, dated September 17, 1889.

Application filed April 5, 1889. Serial No. 306,130. (No model.)

*To all whom it may concern:*

Be it known that I, JOHN HOWARD MCCORMICK, a citizen of the United States, residing at New Orleans, in the parish of Orleans and State of Louisiana, have invented certain new and useful Improvements in Machines for Delinting Cotton-Seed; and I do declare the following to be a full, clear, and exact description of the invention, such as will enable others skilled in the art to which it appertains to make and use the same.

My invention relates to machines for delinting cotton-seed; and my object is to regin cotton-seed without decorticating the same or cutting into the cortical portion and allowing the oil to saturate the lint. Furthermore, my object is to make a conical gin which shall be practically a series of saws formed in a conical shell, in combination with combing-teeth or doffers or cards.

Other features of my invention, together with those above referred to, will appear from the following description and claims, taken in connection with the annexed drawings, in which—

Figure 1:
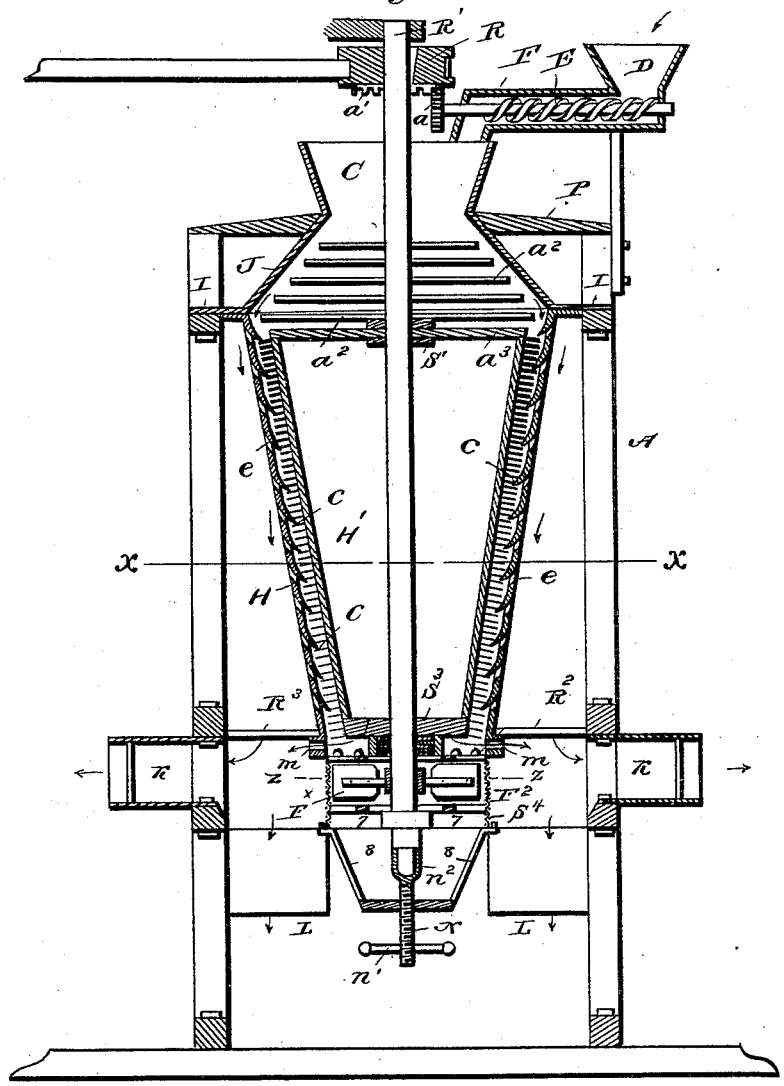
Figure 2:
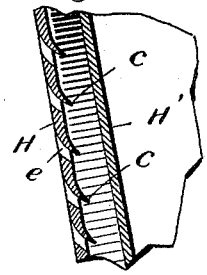

Figure 1 is a vertical central section of a machine embodying my improvements. Fig. 2 is an enlarged view showing a fragment of my improved perforated-cylinder gin-saw and of the card-clothing on the interior cone. Fig. 3 is a horizontal section taken through broken line $xx$ on Fig. 1. Fig. 4 shows an exterior view of my ginning-cone as thrown open, its perforations not being shown. Fig. 5 is a horizontal section through dotted line $zz$ on Fig. 1. Fig. 6 is an enlarged view in perspective of a portion of my cone-shaped multiple gin-saw.

Referring to the annexed drawings, A designates the main frame of my improved cotton-seed-delinting machine. Surmounting this frame is a plate P, above which is a hopper C, into which the cotton-seed is fed through a trough F by means of an endless screw E, leading from a hopper D, into which the seed with the lint on it is deposited. This feeder delivers the linted seed into the hopper C by reason of the rotative motion imparted to the shaft F through the spur-wheel $a$ and the face-spur $a'$ of the belt-wheel R of the shaft R'. Below the plate P on the shaft R' is a series of radial arms $a^2$, inclosed by a frustum of a spreading cone or receiver J, the base-flange I of which is bolted to the horizontal bars of the main frame A. Below this conical frustum J and bolted to the flange thereof is my improved inverted conical gin-saw perforated shell H, the terminus of which is secured to horizontal brace-arms $R^2$ and $R^3$. Beneath these arms are radial spouts K K for the discharge of the lint-cotton after it leaves the perforations $m$ at the lower end of the shell H and is subjected to the blast produced by the fan, and below these are directing-spouts L for the discharge of the delinted seed.

The shell H, which constitutes one of the essential elements of my invention, is perforated at $e$, the perforations being directed from the outside downwardly, as clearly shown in Fig. 2 of the annexed drawings. On the inner side of this shell H, and in close proximity to the said perforations, I strike up or otherwise form teeth $c$. These teeth are the gin-saw teeth, and they are adapted to tear the lint from the berry without materially abrading it. In fact, I have now shown a conical multiple gin-saw. Inside of this peculiarly-constructed cone is a conical carding-brush H', secured to the central shaft R' by a cap $a^3$ and washer-nut S', and also by a base-plate $S^3$. This inside cone is practically the doffer or delinting-brush. At the same time it serves to throw off by centrifugal action, through the perforations in the shell H, the fine lint, which, not being in the range of an air-blast, falls through the spaces between the brace-arms $R^3$, as indicated by the direction of the arrows on Fig. 1.

Below the closed base of the doffing or carding cone H' and secured to the central vertical shaft R' is a fan $F^\times$, inclosed in a case having a periphery of wire-gauze $F^2$. Above this wire are provided the outlets $m$ for lint-cotton, and also the seed deprived of its lint. The top of the fan-casing is composed of a grating similar to that forming the bottom of said casing. The bottom of the said case is perforated or grated, as indicated at 7 7 on Fig. 1, and below this there is a skirting $S^4$. This skirting, which is merely a downward continuation of the screen $F^2$, terminates just above an angular spider 8, secured to the spouts L, the bottom of which spider is tapped and receives through it a vertical screw N, which has a hand-wheel $n'$ keyed on it and which is provided with a cup-shaped step $n^2$ at its upper end, in which is seated the lower end of the shaft R'.

It will be observed that the shaft which carries the carding-cone is vertically adjustable, together with the fan and the distributing and opening arms $a^2$.

For the purpose of readily cleaning my perforated ginning-cone I construct it in vertical halves, as indicated in Figs. 3 and 4, having the hinge at 2 and suitable fastenings 3 and 4. I also show in Fig. 3 the radial bracing-arms $R^3$ for sustaining the shell H.

It will be observed from the foregoing that I provide means for gradually feeding the lint cotton-seed into a hopper; that I provide stirring-blades for preventing the choking up of the seed and for spreading the seeds in the cone J before they are delivered between the brush or card-clothed cone and the delinting-saw cone; that I provide means for adjusting the space between the two cones H H', according to the conditions of the seed, and, finally, I provide means for blowing the lint from the machine and separating it from the seeds.

Having described my invention, I claim—

1. The combination of a feed-hopper, a screw-feeder in a delivering-trough, a receiving-hopper, a spreading-cone having radial rotative arms inside of it, the perforated internally-serrated cone, and a rotative brush-cone, substantially as specified.

2. The combination, in a cotton-seed-delinting machine, of a feeding device, a receiving-cone, centrifugal distributing-arms arranged in a spreading-cone, a perforated and interiorly-serrated delinting-cone, an interior rotative brush-cone, a fan fixed to the shaft of the latter, a separating-screen surrounding the fan, and an adjustable step for said shaft, all constructed and adapted to operate substantially in the manner and for the purposes described.

In testimony whereof I affix my signature in presence of two witnesses.

JOHN H. McCORMICK.

Witnesses:
JOHN A. ADAMS,
PERCY D. PARKS.